(12) United States Patent
Bouleti et al.

(10) Patent No.: US 8,356,635 B2
(45) Date of Patent: Jan. 22, 2013

(54) FLUID TRANSPORT DEVICE, IN PARTICULAR FOR FUEL

(75) Inventors: Julien Bouleti, Orleans (FR); Christina Gonzalez Bayon, Chalette sur Loing (FR); Daniel Mahin, Savonnieres (FR)

(73) Assignee: ESPA, Paris (FR)

( * ) Notice: Subject to any disclaimer, the term of this patent is extended or adjusted under 35 U.S.C. 154(b) by 711 days.

(21) Appl. No.: 12/615,567

(22) Filed: Nov. 10, 2009

(65) Prior Publication Data
US 2010/0122749 A1 May 20, 2010

(30) Foreign Application Priority Data

Nov. 20, 2008 (FR) ...................................... 08 06526

(51) Int. Cl.
*F16L 9/14* (2006.01)
*F16L 55/00* (2006.01)
(52) U.S. Cl. .......... 138/109; 138/177; 174/47; 174/74 R
(58) Field of Classification Search ................... 138/177, 138/109, 140; 174/47, 74 R
See application file for complete search history.

(56) References Cited

U.S. PATENT DOCUMENTS

| | | | | |
|---|---|---|---|---|
| 3,580,983 | A * | 5/1971 | Jackson | 174/47 |
| 6,279,617 | B1 * | 8/2001 | Havn | 138/155 |
| 2005/0121094 | A1 * | 6/2005 | Quigley et al. | 138/125 |
| 2008/0271801 | A1 * | 11/2008 | Sonderegger et al. | 138/33 |
| 2010/0025079 | A1 * | 2/2010 | Flynn | 174/21 JS |
| 2010/0210204 | A1 * | 8/2010 | Angelico | 454/338 |

FOREIGN PATENT DOCUMENTS

| | | |
|---|---|---|
| DE | 10 2005 013981 A1 | 9/2006 |
| EP | 0 297 990 A | 1/1989 |
| FR | 2 379 143 A | 8/1978 |
| GB | 2 211 266 A | 6/1989 |

OTHER PUBLICATIONS

International Search Report from French Application No. 08 06526, filed Nov. 20, 2008.

* cited by examiner

*Primary Examiner* — Patrick F Brinson
(74) *Attorney, Agent, or Firm* — Alston & Bird LLP

(57) ABSTRACT

The invention relates to a fluid transport device for incorporating in a structure that is not electrically insulating, in particular being made of a composite and including an electrically resistive tube, with conductive end pieces including means for fastening to said structure, wherein the tube comprises a central section having resistance of less than $10*4\Omega$ per meter of length and two end sections, at least one of which presents effective resistance lying in the range of $10\,\Omega k$ to $500\,\Omega k$ and terminating in an end coupling; at least one conductive end piece and an end section having a said effective resistance lying in the range of $100\,\Omega k$ to $500\,\Omega k$, said effective resistance being defined as the value of the resistance of the end section between the central section and the conductive element.

10 Claims, 2 Drawing Sheets

FLUID TRANSPORT DEVICE, IN PARTICULAR FOR FUEL

CROSS REFERENCE TO RELATED APPLICATIONS

This application claims priority from French Application No. 08/06526, filed Nov. 20, 2008, which is hereby incorporated herein in its entirety by reference.

FIELD OF THE INVENTION

The present invention provides a fluid transport device, in particular for transporting fuel in an aviation application.

BACKGROUND OF THE INVENTION

Airplane wings are usually made in the form of a structure of composite material that is not electrically insulating together with stiffening elements that are electrically conductive and generally made of aluminum.

The fuel pipes situated inside airplane wings need to be capable firstly of discharging electrostatic charge, and secondly of avoiding short-circuiting the structure in the event of a lightning strike.

It is known to design tubes having a central section made of a material having high resistivity together with two end sections made of conductive material that are connected by conductive wires to conductive endpieces each of which is secured to a stiffener element.

The material constituting the central section is an epoxy resin filled with fiberglass and carbon black, thus implying relatively high weight.

OBJECT AND SUMMARY OF THE INVENTION

An object of the present invention is thus to provide the looked-for function while reducing the weight and possibly also the cost of the tube.

To this end, the invention provides a fluid transport device for incorporating in a structure that is not electrically insulating, in particular being made of a composite and including an electrically resistive tube, with conductive endpieces including means for fastening to said structure, wherein the tube comprises:

a central section having resistance of less than $10^4$ ohms ($\Omega$) per meter of length; and two end sections, at least one of which presents effective resistance lying in the range 100 kiloohms (k$\Omega$) to 500 k$\Omega$ and terminating in an end coupling;

at least one conductive element electrically connecting a conductive endpiece and an end section having a said effective resistance lying in the range 100 k$\Omega$ to 500 k$\Omega$, said effective resistance being defined as the value of the resistance of the end section between the central section and the conductive element.

In a first variant, the device presents two end sections presenting an effective resistance lying in the range 100 k$\Omega$ to 500 k$\Omega$ and two said conductive elements each connecting one end section to the corresponding conductive endpiece.

At least one end section may include an extension of the central section, which extension is surrounded in succession by a conductive sleeve and an end coupling.

At least one conductive element may be a conductive wire or a conductive gasket.

In a first embodiment of a second variant, the device presents two end sections presenting respective effective resistances lying in the range 100 k$\Omega$ to 500 k$\Omega$ and at least one said conductive element disposed on a single end section and connecting it to the corresponding conductive endpiece.

In a second embodiment of the second variant, the device presents a first end section presenting resistance lying in the range 100 k$\Omega$ to 500 k$\Omega$ and a second end section presenting effective resistance less than said value, and at least one said conductive element disposed on the second end section and connecting it to the corresponding conductive endpiece.

The central section may be made of a thermoplastic, thermosetting, or elastomer material with conductive fillers, which act both to provide mechanical reinforcement and to adjust conductivity.

At least one end section may be made of a material filled with fiberglass and conductive particles.

At least one end coupling may be made of a thermoplastic or thermosetting material with optional conductive fillers.

BRIEF DESCRIPTION OF THE DRAWINGS

The invention can be better understood on reading the following description with reference to the drawings, in which.

MORE DETAILED DESCRIPTION

Figure 1A:
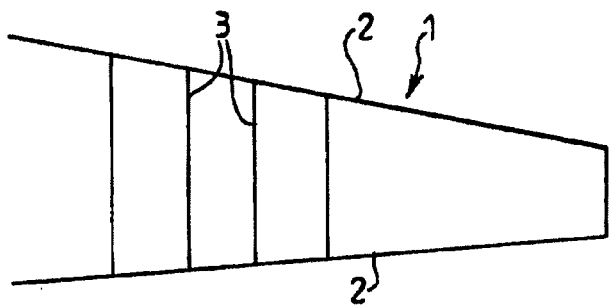
FIGS. 1a and 1b are diagrams illustrating an airplane wing structure.
Figure 1B:
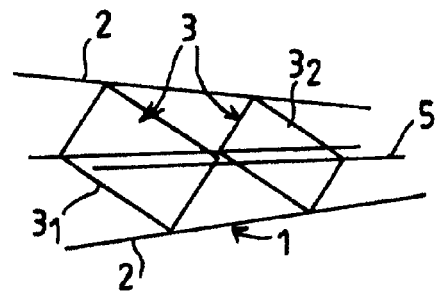

FIG. 1a is a diagrammatic section view of a portion of an airplane wing 1 that comprises a structure 2 made of composite material presenting resistance per unit length of $10^3$ ohms per meter ($\Omega/m$), and stiffener elements 3 of conductive material such as aluminum. One or more tubes 5 for conveying fuel (FIG. 1b) are secured at their ends to two structural elements $3_1$ and $3_2$.

Figure 1C:
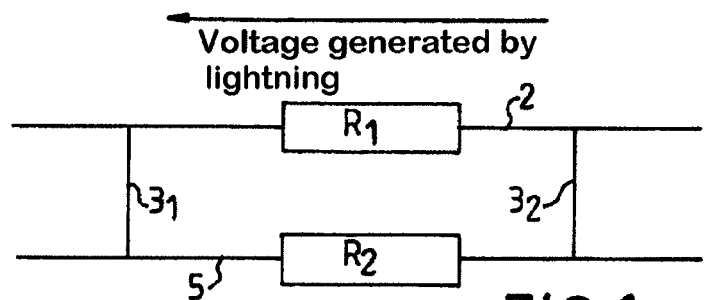
FIG. 1c is an equivalent electrical circuit diagram for a fuel pipe.

An electrical circuit diagram is given in FIG. 1c. It is assumed that the equivalent resistance of the structure is $R_1 = 10^3 \, \Omega/m$.

The tube 5 for performing this function needs to have resistance that is much higher than that value, e.g. $R_2 = 10^5 \, \Omega/m$.

Figure 2:
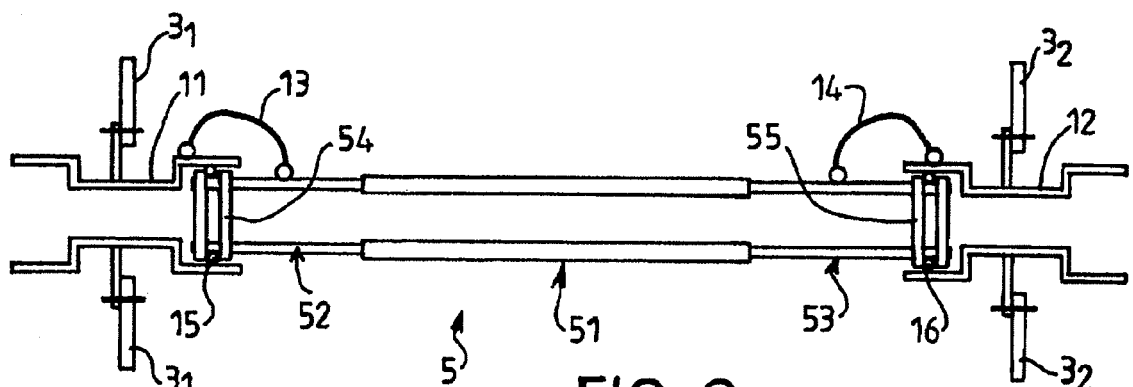
FIG. 2 shows a prior art tube.

The tube shown in FIG. 2 presents a central section 51, e.g. made of epoxy resin filled with fiberglass and carbon black, presenting resistivity lying in the range $10^5$ ohm-meters ($\Omega \cdot m$) to $10^6 \, \Omega \cdot m$. Since its resistivity is high, it needs to have a fiberglass fill, which requires thickness to be relatively great to ensure its mechanical properties. The end sections 52 and 53 are of conductive material, e.g. of Al, and they are extended by constructive end couplings 54 and 55. Conductive wires 13 and 14 enable the end sections 52 and 53 to be connected electrically with the conductive couplings 11 and 12 through which the fuel passes. Sealing is provided by electrically insulating gaskets 15 and 16. The conductive couplings 11 and 12 are fastened on structural elements $3_1$ and $3_2$.

Figure 3A:
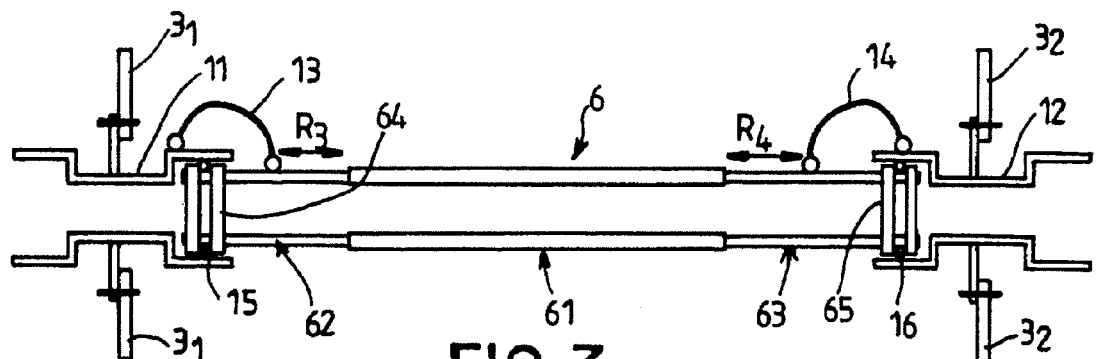
FIGS. 3a and 3b show two embodiments of a first variant of the invention.
Figure 3B:
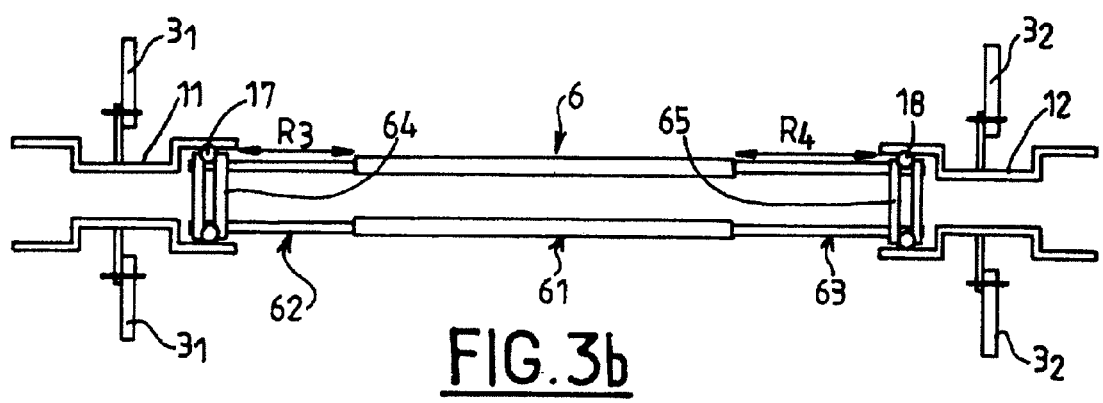

The first variant of the invention is shown in FIGS. 3a and 3b. A tube 6 of length lying for example in the range 0.2 meters (m) to 1.2 m, presents a central segment 61 of conductive material presenting resistance per unit length that is less than $10^4 \, \Omega/m$, while the end segments present effective resistance lying in the range 100 kΩ to 500 kΩ, where effective resistance is defined as being the resistance $R_3$ or $R_4$ of the end section 62 or 63, and where applicable of the coupling 64, 65, 64', or 65' between the central segment 61 and the point 13' or 14' where the wire 13 or 14 makes contact with the end segment 62 or 63 extended by a conductive or insulating end coupling 64 or 65. An end coupling 64 and/or 65 may be made of an adhesively-bonded or heat-sealed thermoplastic material (e.g. polyamide, polyetheretherketone (PEEK), polyethylimide (PEI)) possibly filled with fibers, in particular carbon fibers for reinforcing it and adjusting its conductivity, or else out of a thermosetting material in which conductivity is optionally adjusted by carbon fibers or by other conductive fillers such as graphite or nanoparticles. By way of example, the central segment 61 is made of a thermosetting material, or of an elastomer with conductive fillers to reinforce it and to adjust its conductivity, e.g. an epoxy resin or a polyamide filled with conductive fillers, in particular carbon fibers. This avoids the central segment 61, which occupies about 80% to 95% of the length of the tube 6, from having fiberglass present therein. This segment preferably presents only conductive fillers.

For example, the end sections 62 and 63 are made of a material, e.g. a polyamide, that is filled with fiberglass, and with conductive fillers, e.g. carbon black.

FIG. 3b shows another embodiment that differs from FIG. 3a by the presence of conductive gaskets 17 and 18 taking the place of the wires 13 and 14. Under such circumstances, the entire length of the end segments 62 and 63 is taken into account when defining the resistances $R_3$ and $R_4$.

Because the central segment 61 has low resistance, it is possible to decrease its weight, and there is no need to add fiberglass (carbon fibers suffice), thereby enabling its thickness to be reduced while still providing the required mechanical properties, thus achieving a saving in weight, e.g. of 20% to 30%. Because the end segments 62 and 63 are not made of metal, a weight saving is obtained that is generally greater than 15%.

The central segment 61 may comprise long carbon fibers in a thermoplastic material, carbon fibers in a thermosetting material, e.g. an epoxy resin, or indeed a filled thermoplastic material or a filled conductive rubber having as its conductive filler carbon fibers that are short (length<1 millimeter (mm)), for example.

The fact that the central segment 61 presents lower resistance than in the prior art is favorable to evacuating charge, whereas in the event of a lightning strike, since the tube 6 presents electrical resistance significantly higher than that of the structure 2, it avoids establishing a short circuit.

Figure 4:
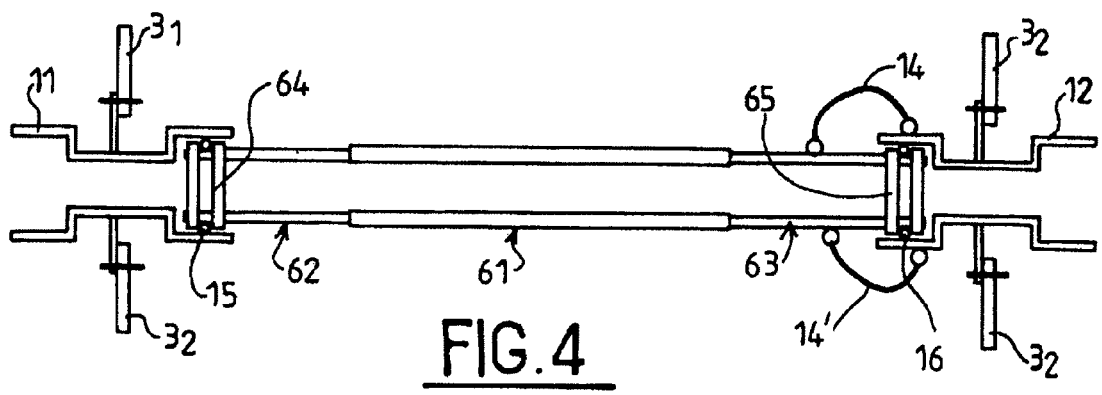
FIG. 4 shows a second variant of the invention.

In the variant of FIG. 4, contact is made only at one end by one or two wires 14 and 14'.

Under such circumstances, it is possible for the end segment 63 to be made of a material that is more conductive than that of the other end segment 61, e.g. to be made of the same material as the central segment 62.

In this configuration, electrostatic charge is evacuated via the electrical connection 14 and/or 14' and insulation against lightning is provided by the fact that the impedance between the couplings 11 and 12 is infinite since the gasket 15 is electrically insulating.

Figure 5:
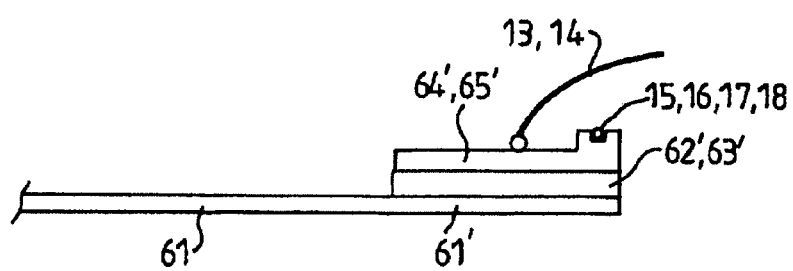
FIG. 5 shows a variant mount for the end couplings.

FIG. 5 shows a variant in which the end segments 62 and 63 are constituted by an extension of the central segment 61, which is surrounded by a resistive sleeve 62' or 63', itself surrounded by an end coupling 64' or 65'. The resistive sleeve may be a resistive adhesive or indeed it may be a rubber or a thermoplastic filled with fiberglass. The end couplings 64' or 65' may be conductive (e.g. made of metal), or they may be resistive.

Contact is made by the wire 13, 14 (or by the conductive gasket) via the end coupling 64' or 65'. When the coupling is resistive, the value of its resistance needs to be taken into account when calculating the effective resistance.

What is claimed is:

1. A fluid transport device for incorporating in a structure that is not electrically insulating, in particular being made of a composite and including an electrically resistive tube, with conductive endpieces including means for fastening to said structure, wherein the tube comprises:
   a central section having resistance of less than $10^4 \Omega$ per meter of length; and
   two end sections, at least one of which presents effective resistance lying in the range of 100 kΩ to 500 kΩ and terminating in an end coupling;
   at least one conductive element electrically connecting a conductive endpiece and an end section having a said effective resistance lying in the range of 100 kΩ to 500 kΩ, said effective resistance being defined as the value of the resistance of the end section between the central section and the conductive element.

2. A device according to claim 1, including two end sections presenting an effective resistance lying in the range of 100 kΩ to 500 kΩ and two said conductive elements each connecting one end section to the corresponding conductive endpiece.

3. A device according to claim 1, wherein at least one conductive element is a conductive wire.

4. A device according to claim 1, wherein at least one conductive element is a conductive gasket.

5. A device according to claim 1, including two end sections presenting respective effective resistances lying in the range of 100 kΩ to 500 kΩ and at least one said conductive element disposed on a single end section and connecting it to the corresponding conductive endpiece.

6. A device according to claim 1, including a first end section presenting resistance lying in the range of 100 kΩ to 500 kΩ and a second end section presenting effective resistance less than said value, and at least one said conductive element disposed on the second end section and connecting it to the corresponding conductive endpiece.

7. A device according to claim 1, wherein the central section is made of a thermoplastic, thermosetting, or elastomer material with conductive fillers.

8. A device according to claim 1, wherein at least one end section is made of a material filled with fiberglass and conductive particles.

9. A device according to claim 1, wherein at least one end coupling is made of a thermoplastic or thermosetting material with optional conductive fillers.

10. A device according to claim 1, wherein at least one end section includes an extension of the central section, which extension is surrounded in succession by a conductive sleeve and an end coupling.

* * * * *

UNITED STATES PATENT AND TRADEMARK OFFICE
CERTIFICATE OF CORRECTION

PATENT NO. : 8,356,635 B2
APPLICATION NO. : 12/615567
DATED : January 22, 2013
INVENTOR(S) : Bouleti et al.

It is certified that error appears in the above-identified patent and that said Letters Patent is hereby corrected as shown below:

On the Title page,
Item (57) ABSTRACT,
Line 6, "less than 10*4Ω" should read --less than $10^4$ Ω--.

Signed and Sealed this
Fourteenth Day of May, 2013

Teresa Stanek Rea
*Acting Director of the United States Patent and Trademark Office*